(12) United States Patent
Niewiadomski et al.

(10) Patent No.: US 11,433,944 B2
(45) Date of Patent: Sep. 6, 2022

(54) AUTOMATED HITCHING SYSTEM WITH VARIABLE BACKING PATHS

(71) Applicant: Ford Global Technologies, LLC, Dearborn, MI (US)

(72) Inventors: Luke Niewiadomski, Dearborn, MI (US); Roger Trombley, Ann Arbor, MI (US); Kyle Simmons, New Boston, MI (US); Bruno Sielly Jales Costa, Santa Clara, CA (US)

(73) Assignee: Ford Global Technologies LLC, Dearborn, MI (US)

( * ) Notice: Subject to any disclaimer, the term of this patent is extended or adjusted under 35 U.S.C. 154(b) by 306 days.

(21) Appl. No.: 16/683,336

(22) Filed: Nov. 14, 2019

(65) Prior Publication Data

US 2021/0146998 A1    May 20, 2021

(51) Int. Cl.
*B62D 15/02* (2006.01)
*G06K 9/62* (2022.01)
*G01S 13/931* (2020.01)
*G06V 20/56* (2022.01)
*B60D 1/06* (2006.01)
*H04N 5/247* (2006.01)
*G06F 3/0488* (2022.01)
*B60D 1/36* (2006.01)

(52) U.S. Cl.
CPC .......... *B62D 15/029* (2013.01); *G01S 13/931* (2013.01); *G06K 9/628* (2013.01); *G06K 9/6289* (2013.01); *G06V 20/56* (2022.01); *B60D 1/06* (2013.01); *B60D 1/36* (2013.01); *G01S 2013/9324* (2020.01); *G01S 2013/93272* (2020.01); *G06F 3/0488* (2013.01); *H04N 5/247* (2013.01)

(58) Field of Classification Search
CPC .................................................... B62D 15/029
See application file for complete search history.

(56) References Cited

U.S. PATENT DOCUMENTS 6,480,104 B1    11/2002    Wall et al.
6,970,184 B2    11/2005    Hirama et al.
7,171,769 B2    2/2007    Schultz et al.
(Continued)

FOREIGN PATENT DOCUMENTS

DE    102012005707 A1    10/2012
EP    2682329 A1    1/2014
GB    2552282 B    1/2018

*Primary Examiner* — Michael A Berns
(74) *Attorney, Agent, or Firm* — Gregory P. Brown; Price Heneveld LLP

(57) ABSTRACT

A system for assisting in aligning a vehicle for hitching with a trailer includes a vehicle steering system, a detection system outputting a signal including scene data of an area to a rear of the vehicle, and a controller. The controller receives the scene data and identifying a trailer and at least one ground surface within the area to the rear of the vehicle and differentiates between first and second portions of the ground surface having first and second ground surface classifications. The controller further derives a backing path to align a hitch ball mounted on the vehicle to a coupler of the trailer to maintain the vehicle within the first portion of the ground surface having the first ground surface classification and controls the vehicle steering system to maneuver the vehicle during reversing along the backing path.

20 Claims, 13 Drawing Sheets

(56) References Cited

U.S. PATENT DOCUMENTS

| | | | |
|---|---|---|---|
| 8,831,831 B2* | 9/2014 | Headley | B62D 15/028 |
| | | | 701/41 |
| 9,108,598 B2 | 8/2015 | Headley | |
| 9,457,632 B1 | 10/2016 | Windeler et al. | |
| 9,499,018 B2 | 11/2016 | Gehrke et al. | |
| 9,889,714 B2* | 2/2018 | Bochenek | B60D 1/62 |
| 9,914,333 B2* | 3/2018 | Shank | B62D 15/0285 |
| 10,696,227 B2* | 6/2020 | Stein | B60W 10/22 |
| 11,014,561 B2* | 5/2021 | Gupta | G08G 1/165 |
| 2005/0246081 A1 | 11/2005 | Bonnet et al. | |
| 2012/0283909 A1 | 11/2012 | Dix | |
| 2013/0158803 A1 | 6/2013 | Headley | |
| 2014/0012465 A1 | 1/2014 | Shank et al. | |
| 2016/0272024 A1 | 9/2016 | Bochenek et al. | |
| 2018/0215382 A1 | 8/2018 | Gupta et al. | |
| 2021/0146998 A1* | 5/2021 | Niewiadomski | G01S 13/93 |

* cited by examiner

AUTOMATED HITCHING SYSTEM WITH VARIABLE BACKING PATHS

FIELD OF THE INVENTION

The present invention generally relates to a vehicle hitch assistance system. In particular, the system adjusts a backing path to align the vehicle with a trailer based on detected ground conditions or a user input.

BACKGROUND OF THE INVENTION

Hitching a trailer to a vehicle can be a difficult and time-consuming experience. In particular, aligning a vehicle hitch ball with the desired trailer hitch can, depending on the initial location of the trailer relative to the vehicle, require repeated forward and reverse driving coordinated with multiple steering maneuvers to appropriately position the vehicle. Further, through a significant portion of the driving needed for appropriate hitch ball alignment, the trailer hitch cannot be seen, and the hitch ball can, under ordinary circumstance, never actually be seen by the driver. This lack of sight lines requires inference of the positioning of the hitch ball and hitch based on experience with a particular vehicle and trailer, and can still require multiple instances of stopping and stepping out of the vehicle to confirm alignment or to note an appropriate correction for a subsequent set of maneuvers. Even further, the closeness of the hitch ball to the rear bumper of the vehicle means that any overshoot can cause the vehicle to come into contact with the trailer. Accordingly, further advancements may be desired.

SUMMARY OF THE INVENTION

According to one aspect of the present disclosure, a system for assisting in aligning a vehicle for hitching with a trailer includes a vehicle steering system, a detection system outputting a signal including scene data of an area to a rear of the vehicle, and a controller. The controller receives the scene data and identifying a trailer and at least one ground surface within the area to the rear of the vehicle and differentiates between first and second portions of the ground surface having first and second ground surface classifications. The controller further derives a backing path to align a hitch ball mounted on the vehicle to a coupler of the trailer to maintain the vehicle within the first portion of the ground surface having the first ground surface classification and controls the vehicle steering system to maneuver the vehicle during reversing along the backing path.

Embodiments of the first aspect of the invention can include any one or a combination of the following features:
- the controller fails to derive the backing path to align the hitch ball with the coupler to maintain the vehicle within the first portion of the ground surface and initially refrains from controlling the vehicle steering system to maneuver the vehicle during reversing along the backing path;
- when the path derivation routine does not successfully produce a backing path that maintains the vehicle on the first portion of the ground surface, the controller derives a backing path to align the hitch ball mounted on the vehicle to a coupler of the trailer that is not constrained to the first portion of the ground surface;
- prior to controlling the vehicle steering system to maneuver the vehicle during reversing along the backing path that is not constrained to the first portion of the ground surface, the controller outputs an indication that the backing path requires a change in driving surface;
- the detection system includes an imaging system including a plurality of video cameras mounted on the vehicle outputting image data of a respective field of view, and one of the controller or the detection system concatenates the image data from each of the plurality of video cameras into a single image data signal included in the scene data;
- the detection system includes at least one of a radar system and an ultrasonic detection system acquiring object position data for the area to the rear of the vehicle, and the object position data is included in the scene data;
- the controller differentiates between different classifications of the ground surface using texture analysis to associate the first ground surface classification with at least a portion of the ground surface having a first texture within a tolerance range;
- the controller differentiates between different classifications of the ground surface by identifying a first specific surface type associated with the first ground surface classification and a second specific surface type associated with a second ground surface classification associated with a portion of the at least one ground surface;
- the controller omits a portion of the scene data comprising the trailer from the ground surface; and
- the controller accepts a user input for adjustment of the backing path.

According to another aspect of the present disclosure, a system for assisting in aligning a vehicle for hitching with a trailer includes a vehicle steering system, an imager outputting image data of a field of view to the rear of the vehicle, and a controller. The controller identifies a coupler of the trailer within the image data and derives a backing path to align a hitch ball mounted on the vehicle to a coupler of the trailer. The controller further receives a user adjustment of the backing path and deriving an adjusted backing path based on the user adjustment and controlling the vehicle steering system to maneuver the vehicle during reversing along the adjusted backing path.

According to another aspect of the present disclosure, a method for assisting in a hitching operation of a vehicle with a trailer includes receiving scene data from a detection system outputting a signal including the scene data of an area to a rear of the vehicle and identifying the trailer and at least one ground surface within the area to the rear of the vehicle. The method also includes differentiating between first and second portions of the ground surface having first and second ground surface classifications, deriving a backing path to align a hitch ball mounted on the vehicle to a coupler of the trailer to maintain the vehicle within the first portion of the ground surface having the first ground surface classification, and controlling a vehicle steering system to maneuver the vehicle during reversing along the backing path.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
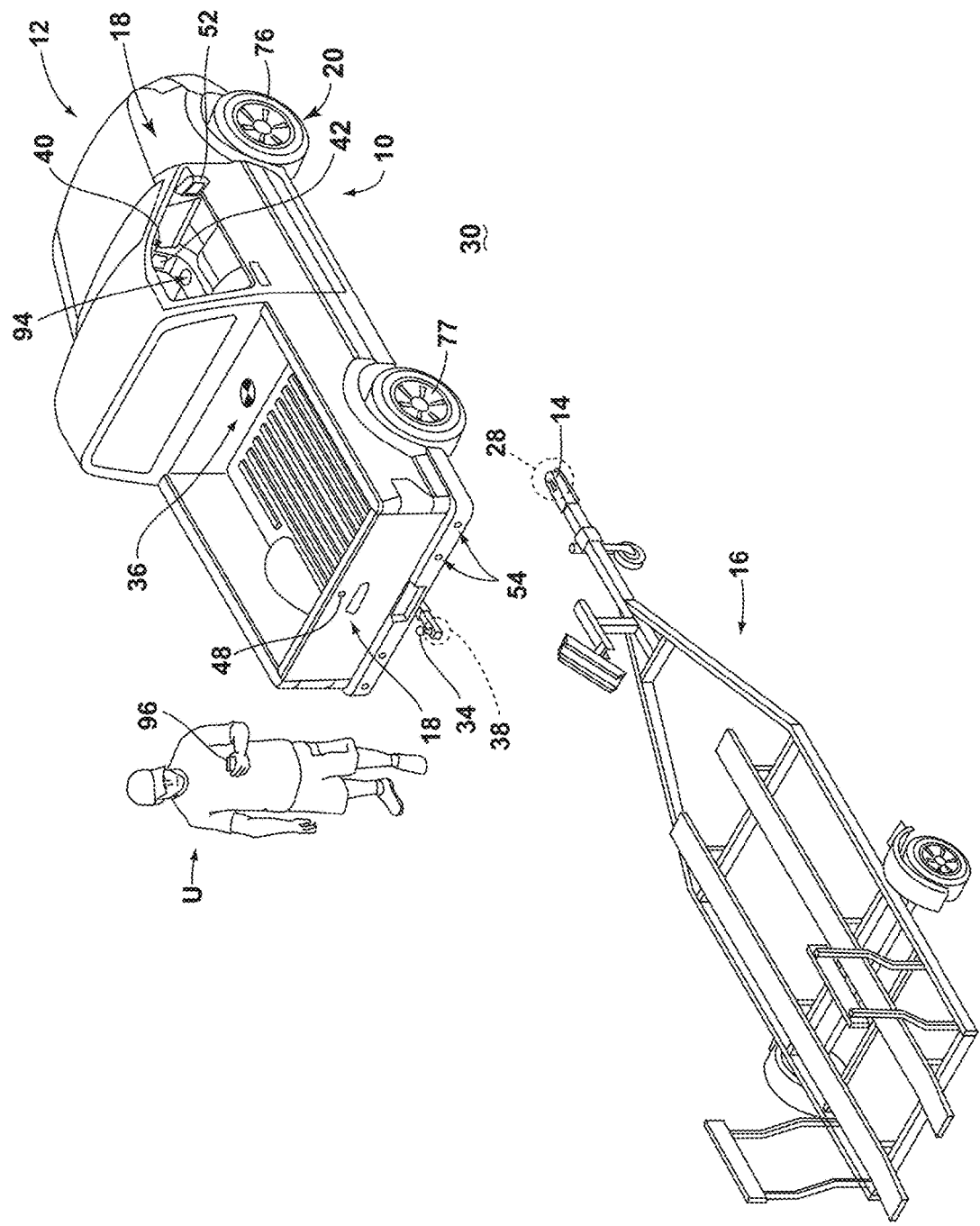
FIG. 1 is a perspective view of a vehicle in an unhitched position relative to a trailer.

For purposes of description herein, the terms "upper," "lower," "right," "left," "rear," "front," "vertical," "horizontal," "interior," "exterior," and derivatives thereof shall relate to the device as oriented in FIG. 1. However, it is to be understood that the device may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature of component extending in or along a given direction or the like does not mean that the feature or component follows a straight line or axis in such a direction or that it only extends in such direction or on such a plane without other directional components or deviations, unless otherwise specified.

Referring generally to FIGS. 1-6, reference numeral 10 designates a hitch assistance system (also referred to as a "hitch assist" system or a "hitching assistance" system) for a vehicle 12. In particular system 10 includes a vehicle steering system 20, a detection system 94 outputting a signal including scene data 55 of an area to a rear of the vehicle, and a controller. The controller 26 receives the scene data 55 and identifies a trailer 16 and at least one ground surface 98 within the area to the rear of the vehicle 12 and differentiates between first and second portions 98a,98b of the ground surface 98 having first and second ground surface classifications. The controller 26 further derives a backing path 32' to align a hitch ball 34 mounted on the vehicle 12 to a coupler 14 of the trailer 16 to maintain the vehicle 12 within the first portion 98a of the ground surface 98 having the first ground surface classification and controls the vehicle steering system 20 to maneuver the vehicle 12 during reversing along the backing path 32'.

Figure 2:
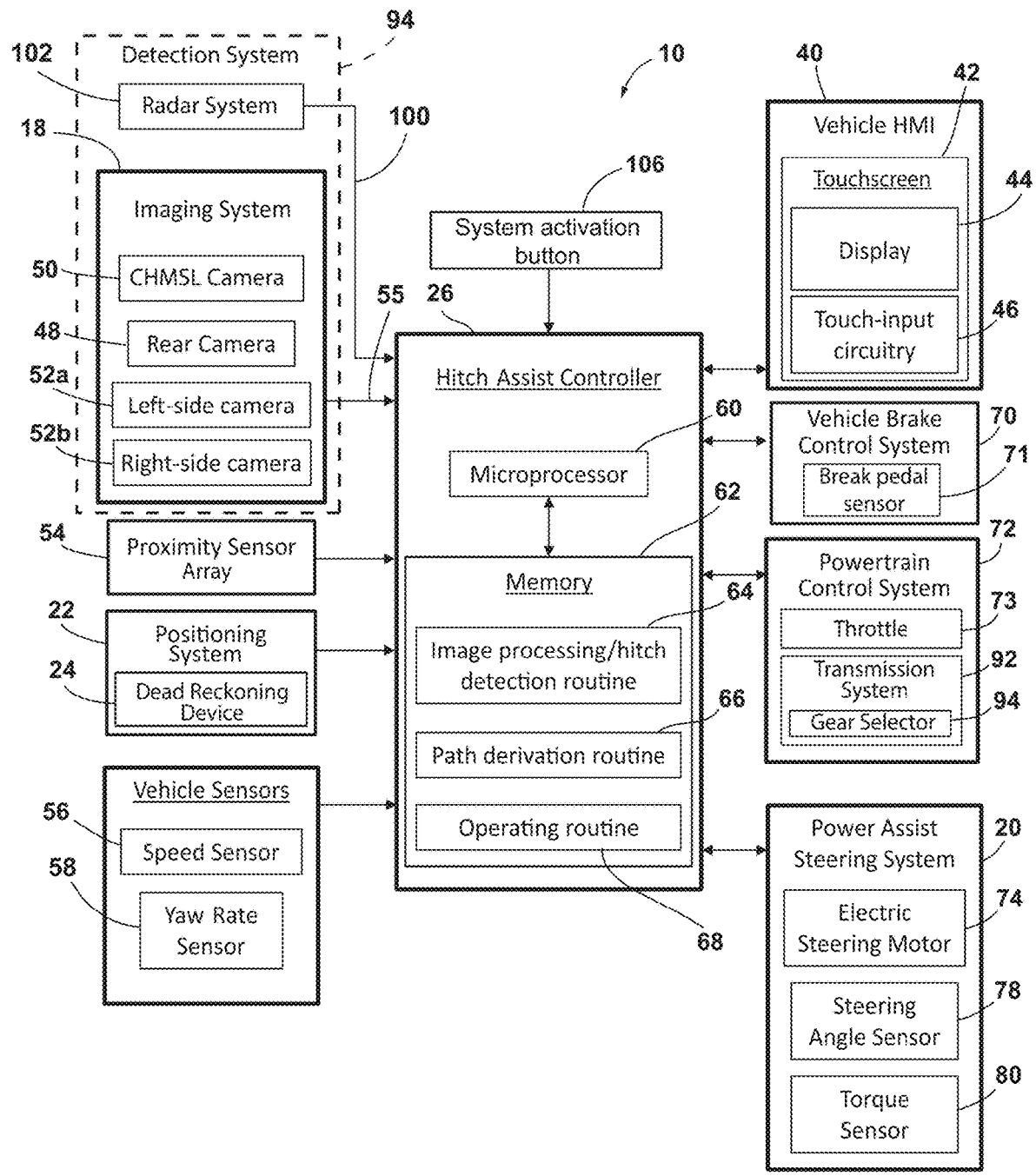
FIG. 2 is a diagram of a system according to an aspect of the disclosure for assisting in aligning the vehicle with a trailer in a position for hitching the trailer to the vehicle.

With respect to the general operation of the hitch assist system 10, as illustrated in the system diagram of FIG. 2, system 10 includes various sensors and devices that obtain or otherwise provide vehicle status-related information. This information includes positioning information from a positioning system 22, which may include a dead reckoning device 24 or, in addition or as an alternative, a global positioning system (GPS), to determine a coordinate location of the vehicle 12 based on the one or more locations of the devices within the positioning system 22. In particular, the dead reckoning device 24 can establish and track the coordinate location of the vehicle 12 within a localized coordinate system 82 based at least on vehicle speed and steering angle δ. Other vehicle information received by hitch assist system 10 may include a speed of the vehicle 12 from a speed sensor 56 and a yaw rate of the vehicle 12 from a yaw rate sensor 58. It is contemplated that in additional embodiments, a proximity sensor 54 or an array thereof, and other vehicle sensors and devices may provide sensor signals or other information, such as sequential images of a trailer 16, including the detected coupler 14, that the controller 26 of the hitch assist system 10 may process with various routines to determine the height H and position of coupler 14.

As further shown in FIG. 2, one embodiment of the hitch assist system 10 is in communication with the steering system 20 of vehicle 12, which may be a power assist steering system 20 including an electric steering motor 74 to operate the steered wheels 76 (FIG. 1) of the vehicle 12 for moving the vehicle 12 in such a manner that the vehicle yaw changes with the vehicle velocity and the steering angle δ. In the illustrated embodiment, the power assist steering system 20 is an electric power-assisted steering ("EPAS") system including electric steering motor 74 for turning the steered wheels 76 to a steering angle δ based on a steering command, whereby the steering angle δ may be sensed by a steering angle sensor 78 of the power assist steering system 20. The steering command 69 may be provided by the hitch assist system 10 for autonomously steering during a trailer hitch alignment maneuver and may alternatively be provided manually via a rotational position (e.g., steering wheel angle) of a steering wheel of vehicle 12. However, in the illustrated embodiment, the steering wheel of the vehicle 12 is mechanically coupled with the steered wheels 76 of the vehicle 12, such that the steering wheel moves in concert with steered wheels 76, preventing manual intervention with the steering wheel during autonomous steering. More specifically, a torque sensor 80 is provided on the power assist steering system 20 that senses torque on the steering wheel that is not expected from autonomous control of the steering wheel and therefore indicative of manual intervention, whereby the hitch assist system 10 may alert the driver to discontinue manual intervention with the steering wheel and/or discontinue autonomous steering. In alternative embodiments, some vehicles have a power assist steering system 20 that allows a steering wheel to be partially decoupled from movement of the steered wheels 76 of such a vehicle.

Figure 3:
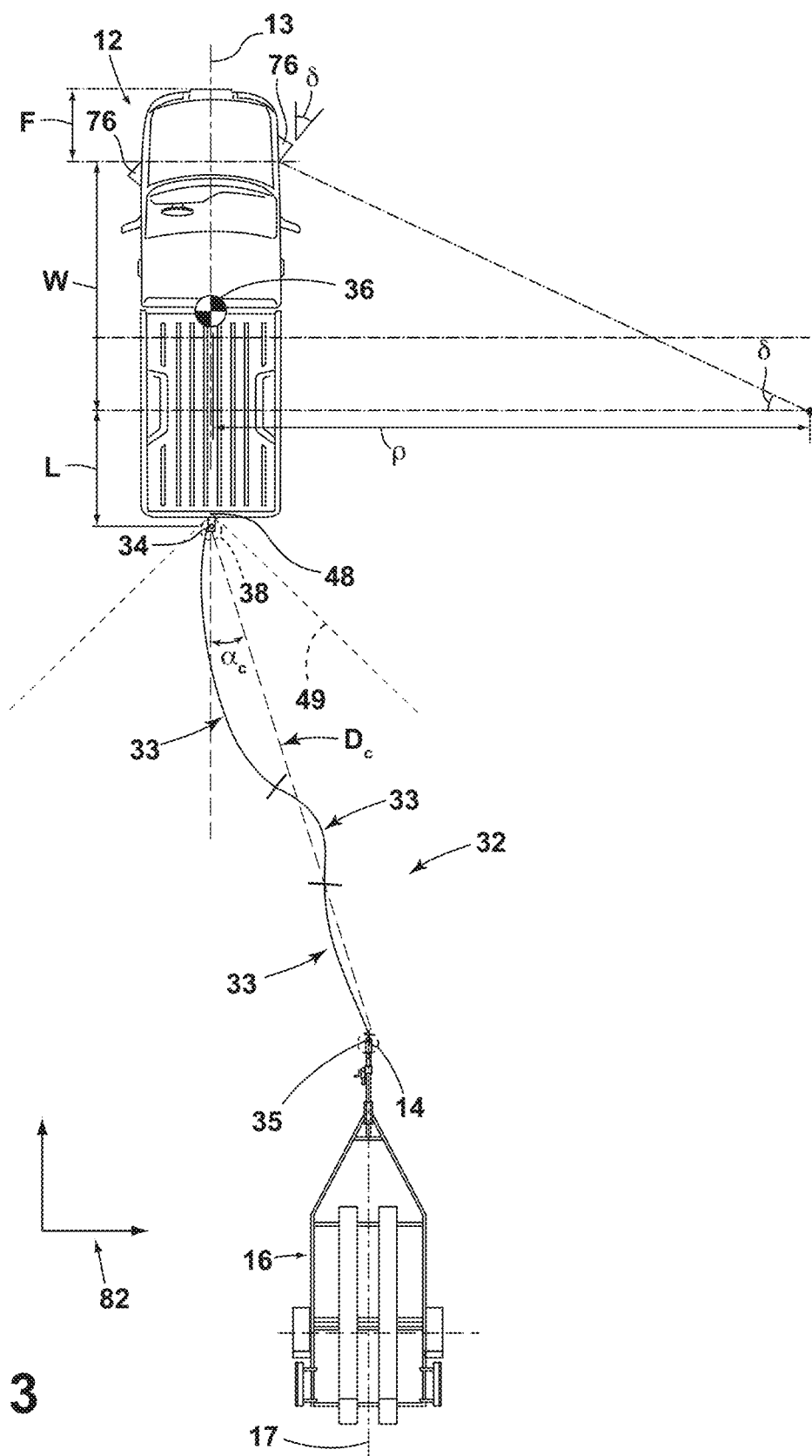
FIG. 3 is an overhead schematic view of a vehicle during a step of the alignment sequence with the trailer.

With continued reference to FIG. 2, the power assist steering system 20 provides the controller 26 of the hitch assist system 10 with information relating to a rotational position of steered wheels 76 of the vehicle 12, including a steering angle δ. The controller 26 in the illustrated embodiment processes the current steering angle, in addition to other vehicle 12 conditions to guide the vehicle 12 along the desired path 32 (FIG. 3). It is conceivable that the hitch assist system 10, in additional embodiments, may be an integrated component of the power assist steering system 20. For example, the power assist steering system 20 may include a hitch assist algorithm for generating vehicle steering information and commands as a function of all or a portion of information received from the imaging system 18, the power assist steering system 20, a vehicle brake control system 70, a powertrain control system 72, and other vehicle sensors and devices, as well as a human-machine interface 40, as discussed further below.

As also illustrated in FIG. 2, the vehicle brake control system 70 may also communicate with the controller 26 to provide the hitch assist system 10 with braking information, such as vehicle wheel speed, and to receive braking commands from the controller 26. For instance, vehicle speed information can be determined from individual wheel speeds as monitored by the brake control system 70. Vehicle speed may also be determined from the powertrain control system 72, the speed sensor 56, and the positioning system 22, among other conceivable means. In some embodiments, individual wheel speeds can also be used to determine a vehicle yaw rate γ, which can be provided to the hitch assist system 10 in the alternative or in addition to the vehicle yaw rate sensor 58. The hitch assist system 10 can, further, provide vehicle braking information to the brake control system 70 for allowing the hitch assist system 10 to control braking of the vehicle 12 during backing of the trailer 16. For example, the hitch assist system 10, in some embodiments, may regulate speed of the vehicle 12 during alignment of the vehicle 12 with the coupler 14 of trailer 16, which can reduce the potential for a collision with trailer 16, and can bring vehicle 12 to a complete stop at a determined endpoint 35 of path 32. It is disclosed herein that the hitch assist system 10 can additionally or alternatively issue an alert signal corresponding to a notification of an actual, impending, and/or anticipated collision with a portion of trailer 16. The powertrain control system 72, as shown in the embodiment illustrated in FIG. 2, may also interact with the hitch assist system 10 for regulating speed and acceleration of the vehicle 12 during partial or autonomous alignment with trailer 16. As mentioned above, regulation of the speed of the vehicle 12 may be advantageous to prevent collision with trailer 16.

Additionally, the hitch assist system 10 may communicate with human-machine interface ("HMI") 40 for the vehicle 12. The HMI 40 may include a vehicle display 44, such as a center-stack mounted navigation or entertainment display (FIG. 1). HMI 40 further includes an input device, which can be implemented by configuring display 44 as a portion of a touchscreen 42 with circuitry 46 to receive an input corresponding with a location over display 44. Other forms of input, including one or more joysticks, digital input pads, or the like can be used in place or in addition to touchscreen 42. Further, the hitch assist system 10 may communicate via wireless communication with another embodiment of the HIM 40, such as with one or more handheld or portable devices 96 (FIG. 1), including one or more smartphones. The portable device 96 may also include the display 44 for displaying one or more images and other information to a user. For instance, the portable device 96 may display one or more images of the trailer 16 on the display 44 and may be further able to receive remote user inputs via touchscreen circuitry 46. In addition, the portable device 96 may provide feedback information, such as visual, audible, and tactile alerts.

Still referring to the embodiment shown in FIG. 2, the controller 26 is configured with a microprocessor 60 to process logic and routines stored in memory 62 that receive information from the above-described sensors and vehicle systems, including the imaging system 18, the power assist steering system 20, the vehicle brake control system 70, the powertrain control system 72, and other vehicle sensors and devices. The controller 26 may generate vehicle steering information and commands as a function of all or a portion of the information received. Thereafter, the vehicle steering information and commands may be provided to the power assist steering system 20 for affecting steering of the vehicle 12 to achieve a commanded path 32 (FIG. 3) of travel for alignment with the coupler 14 of trailer 16. The controller 26 may include the microprocessor 60 and/or other analog and/or digital circuitry for processing one or more routines. Also, the controller 26 may include the memory 62 for storing one or more routines, including an image processing routine 64 and/or hitch detection routine, a path derivation routine 66, and an operating routine 68. It should be appreciated that the controller 26 may be a stand-alone dedicated controller or may be a shared controller integrated with other control functions, such as integrated with a vehicle sensor system, the power assist steering system 20, and other conceivable onboard or off-board vehicle control systems. It should further be appreciated that the image processing routine 64 may be carried out by a dedicated processor, for example, within a stand-alone imaging system for vehicle 12 that can output the results of its image processing to other components and systems of vehicle 12, including microprocessor 60. Further, any system, computer, processor, or the like that completes image processing functionality, such as that described herein, may be referred to herein as an "image processor" regardless of other functionality it may also implement (including simultaneously with executing image processing routine 64).

System 10 can also incorporate an imaging system 18 that includes one or more exterior cameras, which in the illustrated examples include rear camera 48, center high-mount stop light (CHMSL) camera 50, and side-view cameras 52a and 52b, although other arrangements including additional or alternative cameras are possible. In one example, imaging system 18 can include rear camera 48 alone or can be configured such that system 10 utilizes only rear camera 48 in a vehicle with multiple exterior cameras. In another example, the various cameras 48, 50, 52a, 52b included in imaging system 18 can be positioned to generally overlap in their respective fields of view, which may correspond with rear camera 48, center high-mount stop light (CHMSL) camera 50, and side-view cameras 52a and 52b, respectively. In this manner, image data 55 from two or more of the cameras can be combined in image processing routine 64, or in another dedicated image processor within imaging system 18, into a single image. In an extension of such an example, the image data 55 can be used to derive stereoscopic image data that can be used to reconstruct a three-dimensional scene of the area or areas within overlapped areas of the various fields of view 49, 51, 53a, 53b, including any objects (obstacles or coupler 14, for example) therein. In an embodiment, the use of two images including the same object can be used to determine a location of the object relative to the two image sources, given a known spatial relationship between the image sources. In this respect, the image processing routine 64 can use known programming and/or functionality to identify an object within image data 55 from the various cameras 48, 50, 52a, and 52b within imaging system 18. In either example, the image processing routine 64 can include information related to the positioning of any cameras 48, 50, 52a, and 52b present on vehicle 12 or utilized by system 10, including relative to the center 36 (FIG. 1) of vehicle 12, for example such that the positions of cameras 48, 50, 52a, and 52b relative to center 36 and/or to each other can be used for object positioning calculations and to result in object position data relative to the center 36 of vehicle 12, for example, or other features of vehicle 12, such as hitch ball 34 (FIG. 1), with known positions relative to center 36. In one aspect, the various systems and vehicle features discussed herein, including imaging system 18, positioning system 22, brake control system 70, powertrain control system 72, power assist steering system 20, proximity sensor array 54, positioning system 22, and the vehicle sensors discussed herein my generally used for purposes of vehicle control, such as under control of the user, including potentially with assistance of an on-board computer or other processor communicating with the systems and features. In this manner, the systems and features can be referred to collectively as a vehicle control system that may be utilized by controller 26 for the automatic vehicle control functionality discussed herein.

The image processing routine 64 can be specifically programmed or otherwise configured to locate coupler 14 within image data 55. In an example, the image processing routine 64 can first attempt to identify any trailers 16 within the image data 55, which can be done based on stored or otherwise known visual characteristics of trailer 16, of a number of different types, sizes or configurations of trailers compatible with system 10, or trailers in general. Controller 26 can seek confirmation from the user that the identification of the trailer 16 is accurate and is the correct trailer for which to complete an assisted hitching operation, as described further below. After the trailer 16 is identified, controller 26 may then identify the coupler 14 of that trailer 16 within the image data 55 based, similarly, on stored or otherwise known visual characteristics of coupler 14 or couplers in general. In another embodiment, a marker in the form of a sticker or the like may be affixed with trailer 16 in a specified position relative to coupler 14 in a manner similar to that which is described in commonly-assigned U.S. Pat. No. 9,102,271, the entire disclosure of which is incorporated by reference herein. In such an embodiment, image processing routine 64 may be programmed with identifying characteristics of the marker for location in image data 55, as well as the positioning of coupler 14 relative to such a marker so that the position 28 of coupler 14 can be determined based on the marker location. Additionally or alternatively, controller 26 may seek confirmation of the determined coupler 14, via a prompt on touchscreen 42. If the coupler 14 determination is not confirmed, further image processing may be provided, or user-adjustment of the position 28 of coupler 14 may be facilitated, either using touchscreen 42 or another input to allow the user to move the depicted position 28 of coupler 14 on touchscreen 42, which controller 26 uses to adjust the determination of position 28 of coupler 14 with respect to vehicle 12 based on the above-described use of image data 55.

In various examples, controller 26 may initially rely on the identification of trailer 16 for the initial stages of an automated hitching operation, with the path 32 being derived to move the hitch ball 34 toward a centrally-aligned position with respect to trailer 16 with the path 32 being refined once the coupler 14 is identified. Such an operational scheme can be implemented when it is determined that trailer 16 is at a far enough distance from vehicle 12 to begin backing without knowing the precise endpoint 35 of path 32 and can be useful when trailer 16 is at a distance where the resolution of the image data 55 makes it possible to accurately identify trailer 16, but at which the coupler 14 cannot be precisely identified. In this manner, initial rearward movement of vehicle 12 can allow for calibration of various system 10 inputs or measurements that can improve the accuracy of distance measurements, for example, that can help make coupler 14 identification more accurate. Similarly, movement of vehicle 12 resulting in a change to the particular image within the data 55 that can improve the resolution or move the coupler 14 relative to the remaining portions of trailer 16 such that it can be more easily identified.

As shown in FIG. 3, the image processing routine 64 and operating routine 68 may be used in conjunction with each other to determine the path 32 along which hitch assist system 10 can guide vehicle 12 to align hitch ball 34 and coupler 14 of trailer 16. Upon initiation of hitch assist system 10, such as by user input on touchscreen 42, for example, image processing routine 64 can identify coupler 14 within the image data 55 and at least attempt to estimate the position 28 of coupler 14 relative to hitch ball 34 using the image data 55 in accordance with one of the examples discussed above to determine a distance $D_c$ to coupler 14 and an angle $\alpha_c$ of offset between a line connecting hitch ball 34 and coupler 14 and the longitudinal axis of vehicle 12. Image processing routine 64 can also be configured to identify the trailer 16 overall and can use the image data of trailer 16, alone or in combination with the image data of coupler 14, to determine the orientation or heading 33 of trailer 16. In this manner the path 32 can further be derived to align vehicle 12 with respect to trailer 16 with the longitudinal axis 13 of vehicle 12 within a predetermined angular range of the heading 33 of trailer 16. Notably, such alignment may not require that the longitudinal axis 13 of vehicle 12 is parallel or collinear with the heading 33 of trailer 16, but may simply be within a range that generally allows connection of hitch ball 34 with coupler 14 without collision between vehicle 12 and trailer 16 and may, further allow immediate controlled backing of trailer 16 using vehicle 12. In this manner, the angular range may be such that the alignment of vehicle 12 with trailer 16 at the end of the operating routine 68 is such that the angle between longitudinal axis 13 and heading 33 is less than the jackknife angle between the vehicle 12 and trailer 16 when coupled or a reasonable estimate thereof. In one example, the angular range may be such that longitudinal axis 13 is within about 30° from collinear with heading 33 in either direction.

Continuing with reference to FIG. 3 with additional reference to FIG. 2, controller 26, having estimated the positioning $D_c$, $\alpha_c$ of coupler 14, as discussed above, can, in one example, execute path derivation routine 66 to determine vehicle path 32 to align the vehicle hitch ball 34 with coupler 14. In particular, controller 26 can have stored in memory 62 various characteristics of vehicle 12, including the wheelbase W, the distance from the rear axle to the hitch ball 34, which is referred to herein as L, as well as the maximum angle to which the steered wheels 76 can be turned $\delta_{max}$. As shown, the wheelbase W and the current steering angle $\delta$ can be used to determine a corresponding turning radius $\rho$ for vehicle 12 according to the equation:

$$\rho = \frac{W}{\tan\delta}, \tag{1}$$

in which the wheelbase W is fixed and the steering angle $\delta$ can be controlled by controller 26 by communication with steering system 20, as discussed above. In this manner, when the maximum steering angle $\delta_{max}$ is known, the smallest possible value for the turning radius $\rho_{min}$ is determined as:

$$\rho_{min} = \frac{W}{\tan\delta_{max}}. \tag{2}$$

Path derivation routine 66 can be programmed to derive vehicle path 32 to align a known location of the vehicle hitch ball 34 with the estimated position 28 of coupler 14 that takes into account the determined minimum turning radius $\rho_{min}$ to allow path 32 to use the minimum amount of space and maneuvers. In this manner, path derivation routine 66 can use the position of vehicle 12, which can be based on the center 36 of vehicle 12, a location along the rear axle, the location of the dead reckoning device 24, or another known location on the coordinate system 82, to determine both a lateral distance to the coupler 14 and a forward or rearward distance to coupler 14 and derive a path 32 that achieves the needed lateral and forward-backward movement of vehicle 12 within the limitations of steering system 20. The derivation of path 32 further takes into account the positioning of hitch ball 34, based on length L, relative to the tracked location of vehicle 12 (which may correspond with the center 36 of mass of vehicle 12, the location of a GPS receiver, or another specified, known area) to determine the needed positioning of vehicle 12 to align hitch ball 34 with coupler 14. It is noted that hitch assist system 10 can compensate for horizontal movement $\Delta x$ of coupler 14 in a driving direction by determining the movement of coupler 14 in the vertical direction $\Delta y$ that will be needed to receive hitch ball 34 within coupler 14. Such functionality is discussed further in co-pending, commonly-assigned U.S. patent application Ser. Nos. 14/736,391 and 16/038,462, the entire disclosures of which are hereby incorporated by reference herein.

As discussed above, once the desired path 32, including endpoint 35, has been determined, controller 26 is then allowed to at least control the steering system 20 of vehicle 12 with the powertrain control system 72 and the brake control system 70 (whether controlled by the driver or by controller 26, as discussed below) controlling the velocity (forward or rearward) of vehicle 12. In this manner, controller 26 can receive data regarding the position of vehicle 12 during movement thereof from positioning system 22 while controlling steering system 20, as needed to maintain vehicle 12 along path 32. In particular, the path 32, having been determined based on the vehicle 12 and the geometry of steering system 20, can adjust the steering angle $\delta$, as dictated by path 32, depending on the position of vehicle 12 therealong. It is additionally noted that in an embodiment, the path 32 may comprise a progression of steering angle $\delta$ adjustment that is dependent on the tracked vehicle position.

As illustrated in FIG. 3, vehicle path 32 can be determined to achieve the needed lateral and rearward movement within the smallest area possible and/or with the lowest number of maneuvers. In the illustrated example of FIG. 3, path 32 can include two portions defined by steering of wheels 76 in different directions to collectively traverse the needed lateral movement of vehicle 12, while providing final straight, rearward backing segment to bring hitch ball 34 into the above-described offset alignment with coupler 14. It is noted that variations in the depicted path 32 may be used. It is further noted that the estimates for the positioning $D_c$, $\alpha_c$ of coupler 14 may become more accurate as vehicle 12 traverses path 32, including to position vehicle 12 in front of trailer 16 and as vehicle 12 approaches coupler 14. Accordingly, such estimates can be continuously derived and used to update path derivation routine 66, if necessary, in the determination of the adjusted endpoint 35 for path 32, as discussed above. In a similar manner, the path 32, as derived using the position and orientation data acquired from a portable device 96, such a smartphone, can be fine-tuned once the image processing routine 64 can identify coupler 14 in the image data 55, with continued updates for path 32 being similarly derived as the image data 55 becomes increasingly clear during the approach toward trailer 16. It is further noted that, until such a determination can be made, the dead reckoning device 24 can be used to track the location of vehicle 12 in its movement along path 32 toward the initially-derived endpoint 35.

Figure 4:
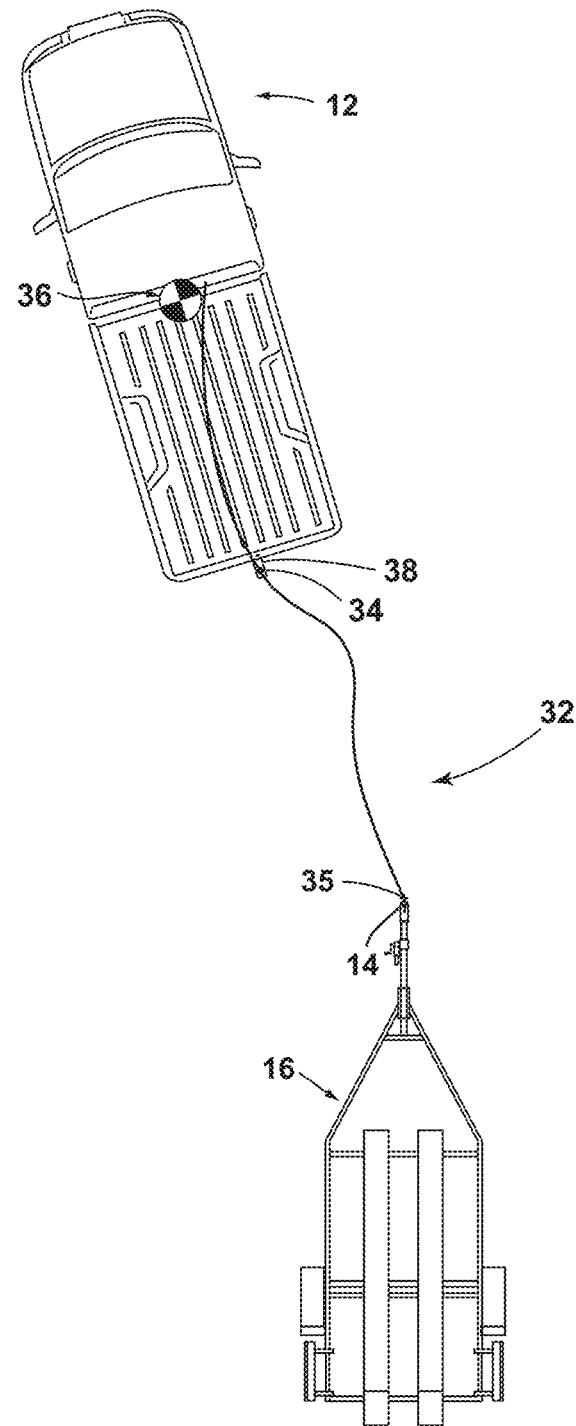
FIG. 4 is an overhead schematic view of the vehicle during a subsequent step of the alignment sequence with the trailer.
Figure 5:
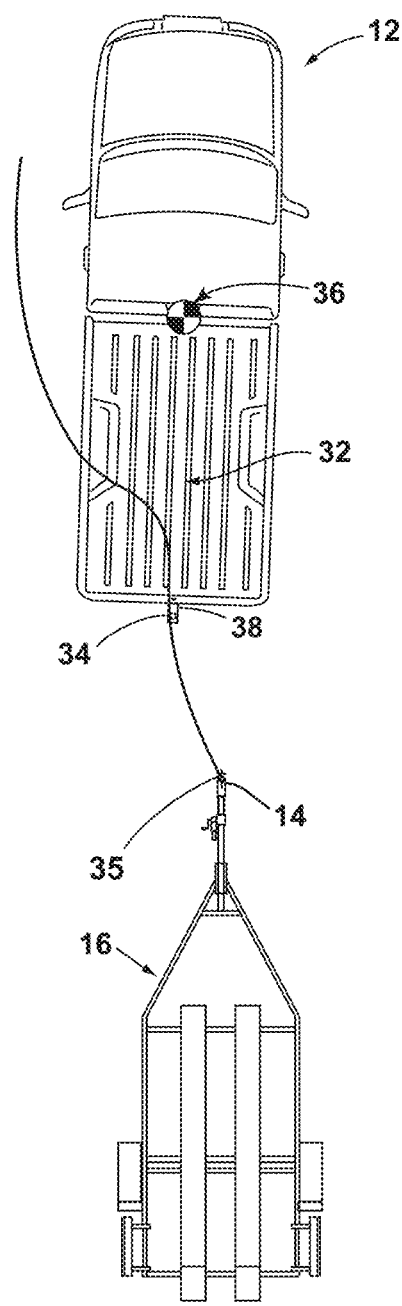
FIG. 5 is an overhead schematic view of the vehicle during a subsequent step of the alignment sequence with the trailer.
Figure 6:
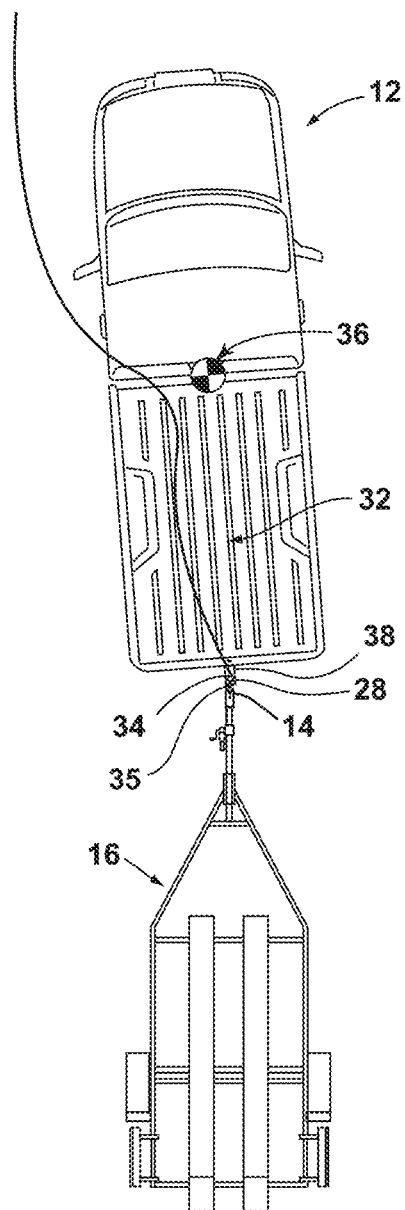
FIG. 6 is an overhead schematic view of the vehicle during a subsequent step of the alignment sequence with the trailer and showing the position of a hitch ball of the vehicle at an end of a derived alignment path.

As shown in FIGS. 4-6, once the trailer 16 and coupler 14 have been identified, and system 10 determines the path 32 to align hitch ball 34 with the coupler 14, the controller 26 executing operating routine 68 may continue to control vehicle 12 until hitch ball 34 is in the desired endpoint 35 relative to coupler 14 for coupler 14 to engage with hitch ball 34 when coupler 14 is lowered into horizontal alignment therewith. In the example discussed above, image processing routine 64 continuously monitors the positioning $D_c, \alpha_c$ of coupler 14, constantly or once available, during execution of operating routine 68, including as coupler 14 comes into clearer view of rear camera 48, with continued movement of vehicle 12 along path 32. As discussed above, the position of vehicle 12 can also be monitored by dead reckoning device 24 with the position 28 of coupler 14 being continuously updated and fed into path derivation routine 66 in case path 32 and or endpoint 35 can be refined or should be updated (due to, for example, improved height $H_c$, distance $D_c$, or offset angle $\alpha_c$ information due to closer resolution or additional image data 55), including as vehicle moves closer to trailer 16, as shown in FIGS. 4 and 5. Still further, the coupler 14 can be assumed to be static such that the position of vehicle 12 can be tracked by continuing to track the coupler 14 to remove the need for use of the dead reckoning device 24. In a similar manner, a modified variation of operating routine 68 can progress through a predetermined sequence of maneuvers involving steering of vehicle 12 at or below a maximum steering angle $\delta_{max}$, while tracking the position $D_c$, $\alpha_c$ of coupler 14 to converge the known relative position of hitch ball 34 to the desired position 38$d$ thereof relative to the tracked position 28 of coupler 14, as discussed above and shown in FIG. 6.

During an assisted hitching operation, such as in the example described with respect to FIGS. 4-6, system 10 requires a minimum amount of longitudinal distance between the vehicle 12 and the trailer 16 to control movement of vehicle 12 with a level of precision desired to achieve the desired final position of hitch ball 34 with respect to coupler 14 (i.e., without overshooting the desired final location, such that hitch ball 34 moves past the coupler 14, or otherwise ending operating routine 68 with hitch ball 34 positioned relative to coupler 14 such that manual movement of trailer 16 is required). The required minimum distance can vary but is generally influenced by the requirements of image processing routine 64, as well as the requirements of speed sensor 56, the responsiveness of the throttle 73 and vehicle brake control system 70, as well as the general processing speed of controller 26 of other components of system 10. In one example, image processing routine 64 may require a minimum travel distance for calibration thereof, including to accurately identify coupler 14 and to assist in tracking of vehicle 12 movement. The particular minimum distance can be estimated for a given implementation of system 10, based on known values or estimates for such factors.

As mentioned above, the "longitudinal control" in an assisted hitching maneuver is the portion of vehicle 12 movement along path 32 controlled by the vehicle powertrain control system 72 and the vehicle brake system 70 with the "longitudinal control" being the portion controlled by the power assist steering system 20. It is to be understood that the lateral control requires movement of the vehicle such that the two control schemes operate together to move vehicle 12 along the path 32. In this respect, the longitudinal alignment of the path 32 with the coupler 14 is dictated by the longitudinal control (i.e., by the steering system 20) and the final stopping point of vehicle 12 along path 32 is dictated by the longitudinal control. In this respect, the final stopping point of the vehicle 12 along path 32 determines the alignment in the direction of travel between hitch ball 34 and coupler 14. In this manner, system 10 may be able to move vehicle 12 to the final target position in a precise manner, for example, such that trailer 16 does not have to be manually repositioned by the user, but can simply be lowered onto hitch ball 34. In one implementation of system 10, the accuracy in final longitudinal alignment of hitch ball 34 with coupler 14 can be to within 1 cm of a completely aligned position (center-to-center). Again, the particular implementation of system 10 can be such that controller 26 requires a minimum amount of longitudinal travel distance to perform a sequence of events for the desired hitch ball 34 and coupler 14 alignment. Such a sequence can include increasing the engine speed (using throttle 73 via powertrain control system 72) and reducing the brake pressure (via brake control system 70) until vehicle 12 begins moving. Controller 26 can receive feedback data during vehicle 12 movement regarding measured vehicle speed and localization (by way of speed sensor 56 and positioning system 22, respectively) such that controller 26 can apply brake pressure and reduce engine speed to bring the vehicle 12 to a standstill at the final target position with hitch ball 34 at endpoint 35.

Figure 7A:
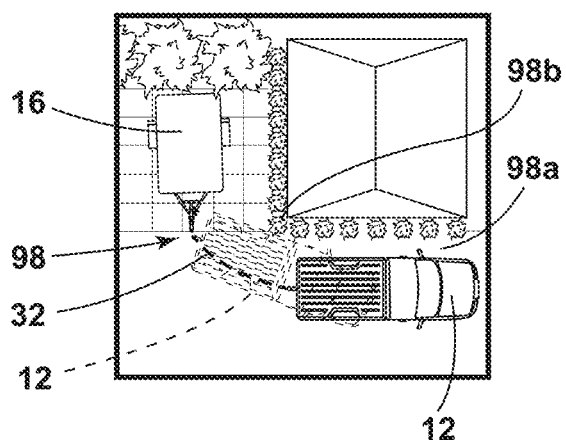
FIGS. 7A and 7B are overhead views showing a vehicle reversing toward a trailer along a standard path and a modified path, respectively.
Figure 7B:
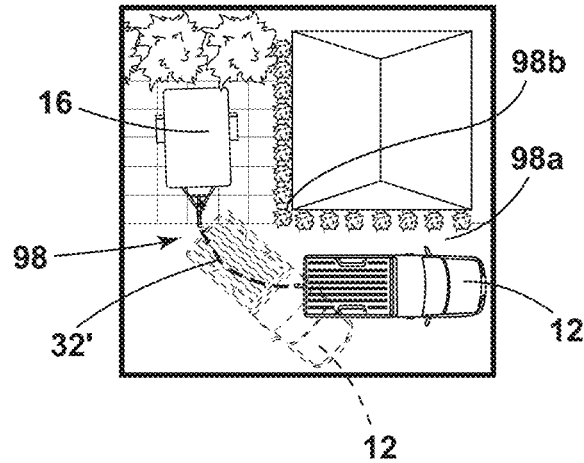
Figure 8:
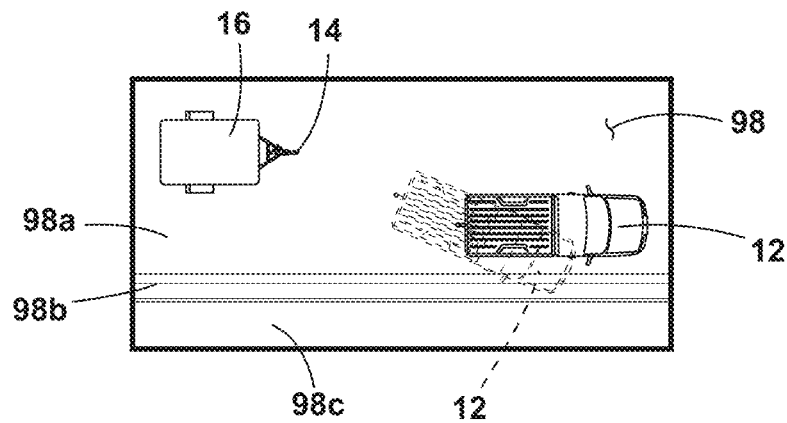
FIG. 8 is an overhead view showing a vehicle in a position relative to a trailer that would result in vehicle swingout onto a different ground surface portion in reversing toward the trailer.

Referring now to FIGS. 7A and 7B, an example setting is shown where, when using path derivation routine 66, as discussed above, to determine a backing path 32 to align hitch ball 34 with coupler 14, the vehicle 12 may be driven onto a non-desirable ground surface. In variations wherein system 10 is agnostic to the driving surface type, system 10 may drive vehicle 12 off the pavement, or into a curb (as depicted in FIG. 8), or other non-ideal scenarios. In the present variation of system 10, the controller 26 is configured to evaluate the ground surface 98 for changes or variations therein to differentiate between classifiable surface types in the vicinity of the vehicle. In various examples, this evaluation and differentiation can be carried out using camera and radar processing techniques, for example, applied respectively to the image data 55 received from camera system 18 and radar data 100 received from a vehicle radar system 102, such data collectively (but not necessarily exclusively) comprising scene data output by a detection system 94 including (but not limited to) the camera system 18 and the radar system 102. By distinguishing between different surface classifications and locating portions of the ground surface 98 of consistent surface classification, including the transitions therebetween, the path derivation routine 66 can derive a path 32' that maintains vehicle 12 on a portion of ground surface 98 having the same surface classification throughout the maneuver. As discussed further below, path derivation routine 66 may also be able to assess if it is not possible to maintain a single surface classification during an automated hitching maneuver and may revert to the use of a standard path 32, while notifying the user accordingly.

As discussed above, the detection system 94 includes an imaging system 18 and may include a plurality of video cameras 48,50,52$a$,52$b$ mounted on the vehicle 12 outputting image data 55 collectively comprised of the various respective fields of view of each included or utilized camera 48,50,52$a$,52$b$ (e.g. field of view 49 of rear camera 48, as illustrated in FIG. 1). The image data 55 can be concatenated by one of the controller 26 or the imaging system 18 into data of a single image of the area to the rear or otherwise directed outward from vehicle 12, such a single image comprising at least a portion of the scene data analyzed by image processing routine 64. The detection system further includes at least one of radar system 100 and an ultrasonic detection system comprised of the proximity sensor array 54 illustrated in FIG. 2. These additional systems can acquire object position data for the area to the rear of or otherwise surrounding vehicle 12, which can also be included in the scene data for use by image processing routine 64.

Figure 9A:
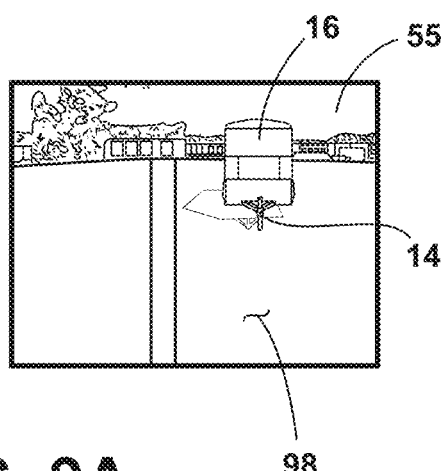
FIGS. 9A and 9B are depictions of image data including multiple ground surface portions and the identification thereof by an automated hitching system.
Figure 9B:
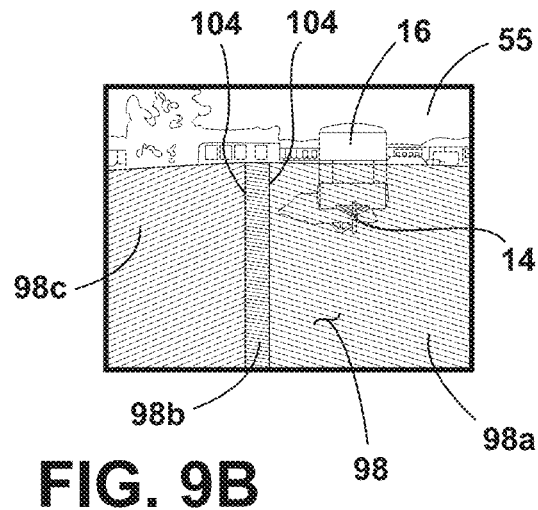

Using the various types of specific data that may be included in the scene data, controller 26 differentiates between different classifications of the ground surface 98 using, for example, a texture analysis algorithm to associate a first ground surface classification with at least a portion 98a of the ground surface 98. In this manner the image processing routine 64 can use vision processing on the image data 55 and or the overall scene data, as depicted in one example in FIG. 9A, to visually map the various surface types in the scene by way of associating all detected ground surface classifications with respective portions of the ground surface 98. As depicted in FIG. 9B, one example of such detection can include the detection and location of three separate portions 98a,98b,98c of the ground surface having different ground surface classifications.

In the example illustrated in FIG. 9B, portion 98a can include an asphalt pavement ground surface classification, portion 98b can include a concrete ground surface classification, and portion 98c can include a grass ground surface classification. Such classifications can be made, for example, using a texture analysis algorithm that performs a similarity evaluation between different, discrete patches of the image data 55. In one example, the similarity measurement can made using an appropriately-trained neural network that employs a triplet-loss function. In that case, the neural network learns to differentiate between similar and different textures (as compared to a reference), without knowing specifically what that texture actually represents. In such an example, the image in FIG. 9B may simply be identified as having three different portions 98a,98b,98c with different ground surface classifications without the specific identifiers noted above.

In an alternate implementation, the image processing routine 64 can classify the precise type of surface, for example, using machine learning techniques. For example, image processing routine 64 can be configured to specifically identify (within an acceptable margin of error) pavement, concrete, grass, dirt, and other ground surfaces and differentiate between such types. This configuration allows for certain decisions to be made by the path derivation routine 66 in deriving the modified path 32'. For example, it may be acceptable to use a path 32 that traverses between asphalt and concrete, such as in a driveway, but not one that traverses asphalt and grass, for example. In another example, traversal of an asphalt-to concrete boundary 104 may be accepted, unless the portion (e.g. portion 98c) opposite the asphalt portion (e.g. 98a) is grass, which may indicate that the concrete portion (e.g. portion 98b) is a curb.

Figure 10:
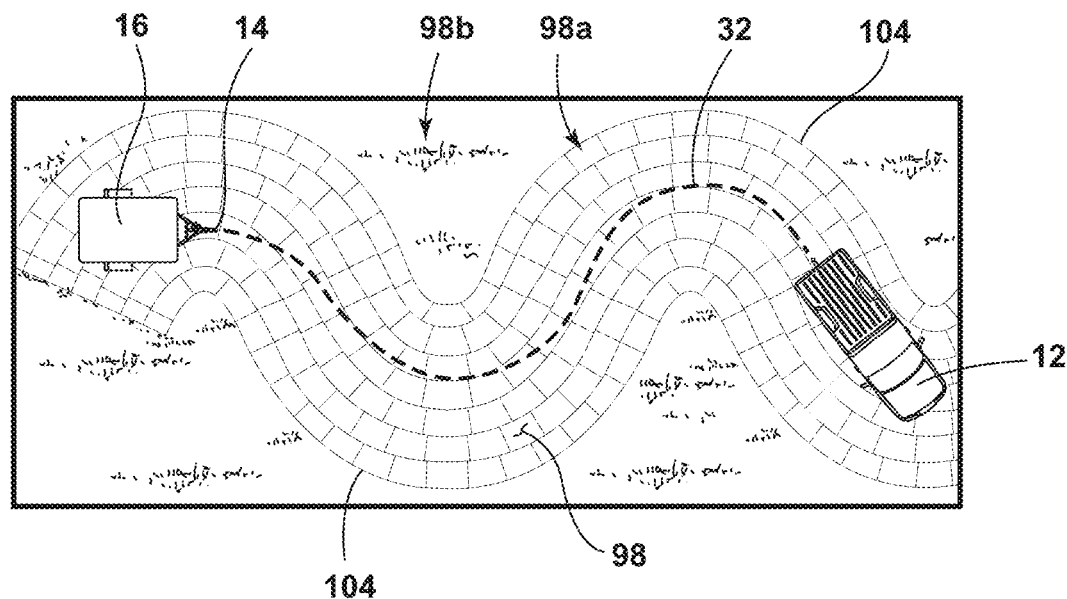
FIG. 10 is an overhead view depicting a modified backing path to maintain a vehicle on a single ground surface portion when reversing toward a trailer.
Figure 11:
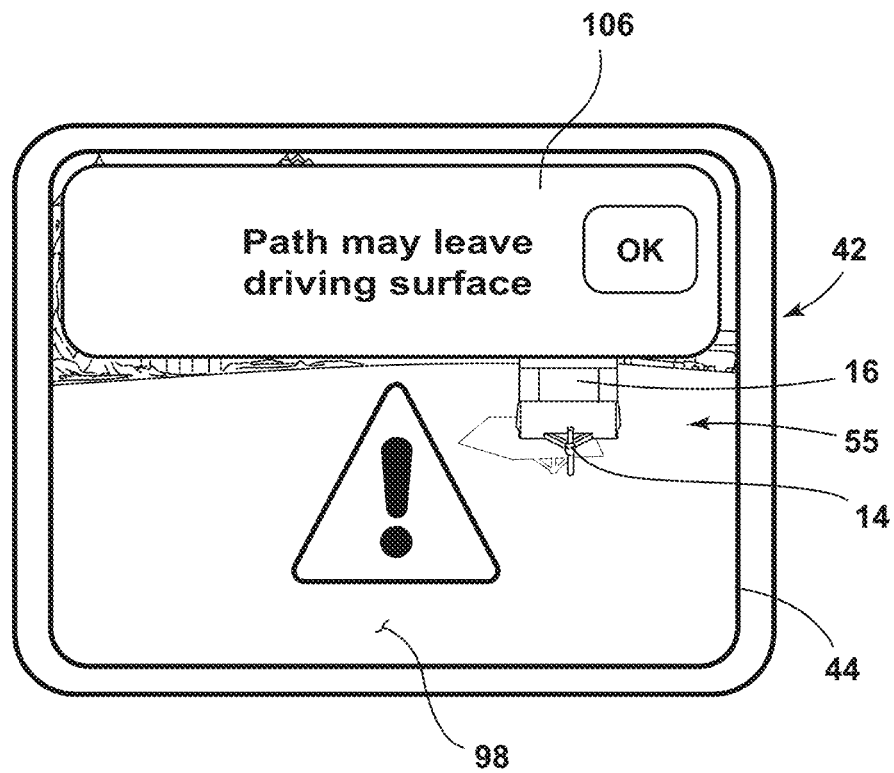
FIG. 11 is a depiction of an example indication presentable to a user of a vehicle when a path cannot be derived to maintain an associated vehicle on a single ground surface portion when reversing toward a trailer.

A tolerance may be used within the image processing routine and can be calibrated to account for sensor noise and variations within the same surface. For example, a dirt surface portion can exhibit a wide variety of appearances, including bumps, small puddles, and the like. By setting a tolerance for the image processing routine 64, the entire portion of the ground surface 98 can be appropriately classified as one surface type portion instead of multiple portions. The tolerance can be set low enough so that certain transitions are captured, such as the change between a pavement surface and a curb (which may both appear to be different tones of gray). It is further noted that the controller 26, by way of image processing routine 64, may omit a portion of the scene data comprising the trailer from the ground surface such that the trailer 16 is not also misidentified as another ground portion. As shown in the additional example of FIG. 10, the controller 26 using image processing routine 64 according to the variations discussed above may, accordingly, be able to differentiate between different classifications of portions 98a,98b of the ground surface 98 by identifying a first specific surface type associated with, for example, a first ground surface classification and a second specific surface type associated with a second ground surface classification within the ground surface 98. Using the delineation of such portions 98a,90b, the path derivation routine 66 can develop a path 32' that maintains the same surface type (e.g. 90a) throughout the entire path 32' by constraining the routine to the first ground surface portion 98a. As shown, such a path 32' may deviate from the path 32 that would normally be derived without the consideration of different surface classifications. The path 32' may be derived such that the surface classification associated with the trailer 16 is maintained for the entire footprint of the vehicle 12 during the anticipated backing maneuver, such that no vehicle wheel 76 drives over a different surface classification throughout the entire maneuver, as shown in the example of FIG. 10.

Because the image processing routine 64 is further constrained by steering limits of the vehicle (including any additional artificial limits imposed thereon) as well as the available image data 55, in some settings, it may not be possible to derive a path 32' that does not result in vehicle 12 crossing or otherwise entering (in whole or in part) a ground surface portion (e.g. ground surface portions 98b or 98c in FIG. 9A) other than the one on which it is initially present (e.g. ground surface portion 98a). For example, in the setting depicted in FIG. 8, a backing path initiating with a steering angle <delta> sufficient to prevent the vehicle front passenger side steered wheel 76 from leaving the first ground surface portion 98a that could still reach coupler 14 without requiring forward driving. In other examples, the trailer 16 and vehicle 12 may be detected as being on two different ground surface portions 98a,98b. This condition can be detected by analyzing the image data 55 to determine the ground surface portions 90a,98b specifically adjacent the vehicle 12 and the trailer 16 or by determining that the boundary 104 between the first and second ground surface portions 98a,98b fully laterally traverses the image data 55. In other examples, the planned path 32 may be rejected if the path derivation routine 66 determines that the path 32 or any potential adjusted path 32' requires a steering curvature beyond the limits of the steering system or vehicle longitudinal direction changes (i.e., shifting from reverse to forward and back, when possible by system 10) more than a threshold setpoint (e.g. number of cycles).

If path derivation routine 66 fails to produce a path 32' that maintains the same ground surface portion 98a and/or type, system 10 can, at least initially, refrain from executing the backing maneuver. More particularly, system 10 can be configured to prohibit operation when trailer 16 is on a different ground surface portion 98b than trailer 16. In another example, system 10 may allow the user to assess if driving from one ground surface portion 98a to another 98b is acceptable (such as when driving from concrete to a grass surface that is even with the concrete or driving from grass to dirt). In such an example, controller 26 can present a message 106 to the user via the HMI 40 screen 44 indicating that the path (32 or 32') may leave the driving surface 98a. If the user accepts the change in driving surface, controller 26 will execute operating routine 68 to back vehicle toward trailer 16 using the initial (i.e., unmodified) path 32. In a variation of this example, an action may be required to begin system 10 execution of operating routine 68 such that the indication 106 alone may be sufficient without requiring the user to accept before then indicating that automated backing is desired. As discussed above, if the alternate path plan is considered "feasible" (e.g., when path derivation routine 66 produces a path 32' that maintains a single ground surface portion 98a or type), then it is used instead of the "standard" path 32. With the path 32' determined, system 10 is ready to maneuver by controller 26 executing operating routine 68 to control steering system 20 to back vehicle 12 along path 32'. In one example, the path 32 and/or adjusted path 32' may be visually displayed to the user on a display screen 44.

Figure 12:
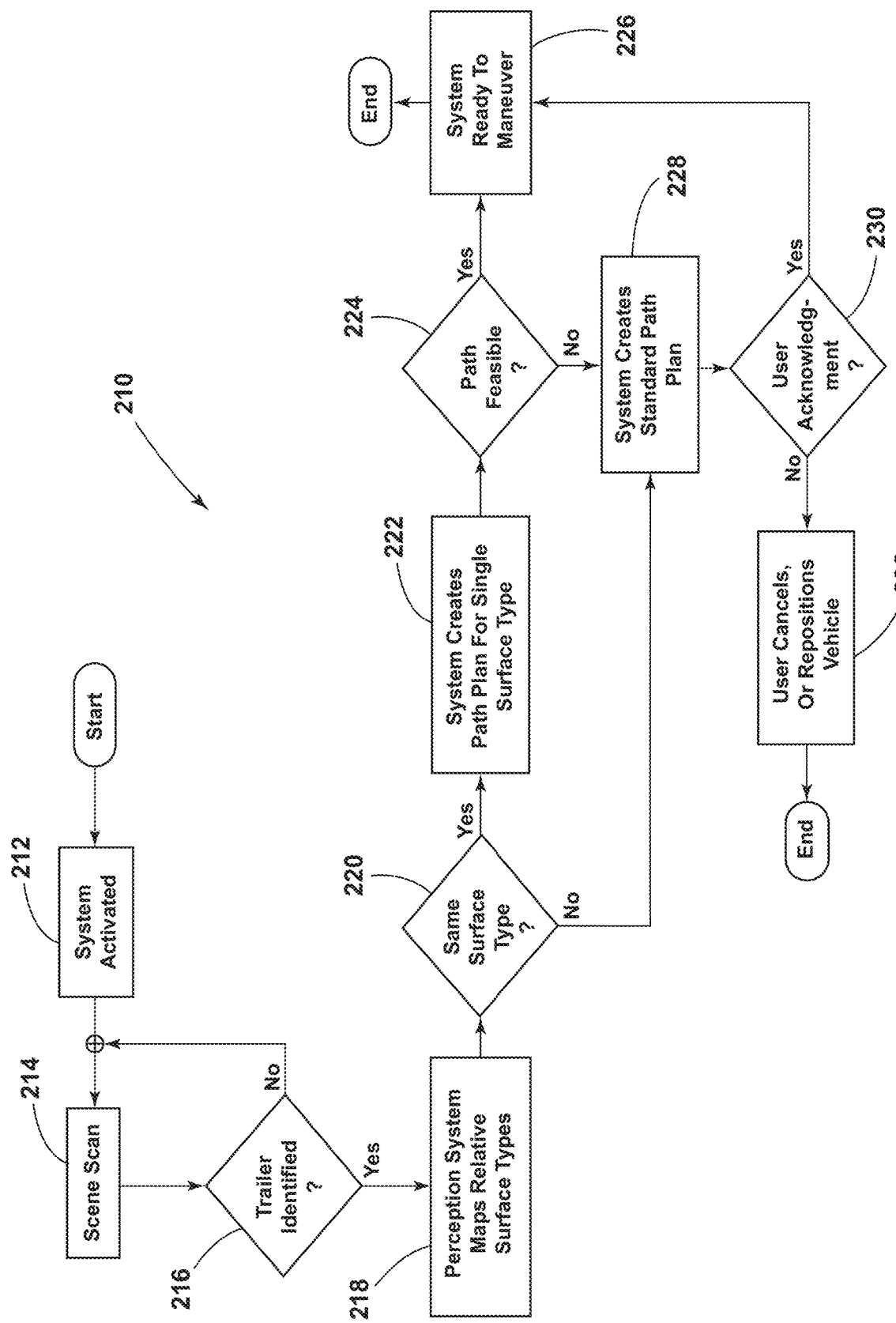
FIG. 12 is a flow chart depicting steps in a method for reversing a vehicle toward a trailer, including an attempt to maintain the vehicle on a single ground surface portion.

Referring to FIG. 12, an aspect of the present disclosure includes a method 210 for assisting in a hitching operation of vehicle 12 with trailer 16 according to the process described above with respect to the operation of system 10. As shown in FIG. 12, once system 10 is activated (step 212), the method includes receiving scene data from detection system of the vehicle and identifying the trailer 16 (step 214). With the same scene data, a map of the ground surface 98 according to various surface types is generated wherein at least one ground surface 98a portion is identified within the area to the rear of the vehicle 12 (step 216). In the depicted variation of the method, can initially determine (step 218) if the vehicle 12 and trailer 16 are on the same ground surface portion 98a or if the trailer 16 is on a different ground surface portion 98b from that of vehicle 98a, which can be done according to any of the processes discussed above. If it is determined that the trailer 16 and vehicle 12 are on the same ground surface portion 98a, an attempt is made (step 220) to generate a path 32' to back vehicle 12 into alignment with trailer 16 on the single ground surface portion 98a within the various constraints (maximum steering angle $\delta_{max}$, number of driving direction changes permitted, etc.) otherwise considered in generating a packing path 32. If such a path 32' is successfully generated (step 222), the system 10 is considered ready to maneuver vehicle 12 toward trailer 16 (step 224), which is carried out as discussed above. If the trailer 16 and vehicle are on different ground surface portions 98b,98a, or if a path 32' cannot be generated to maintain a single ground surface in step 222, then a path 32 is derived without considering the difference in ground surface portions 98a,98b (step 226). A notification is presented to the user that the path 32 includes a change in grounds surface portions 98a,98b and/or ground surface type with a request (step 228) for the user to confirm that such a path is acceptable. If a single-surface path plan is accepted by the user (step 230), it is also determined that the system 10 is ready for a backing maneuver along path 32 (step 224). If the path is not accepted or the vehicle is repositioned, the process is canceled (step 232).

Figures 13A, 13B:
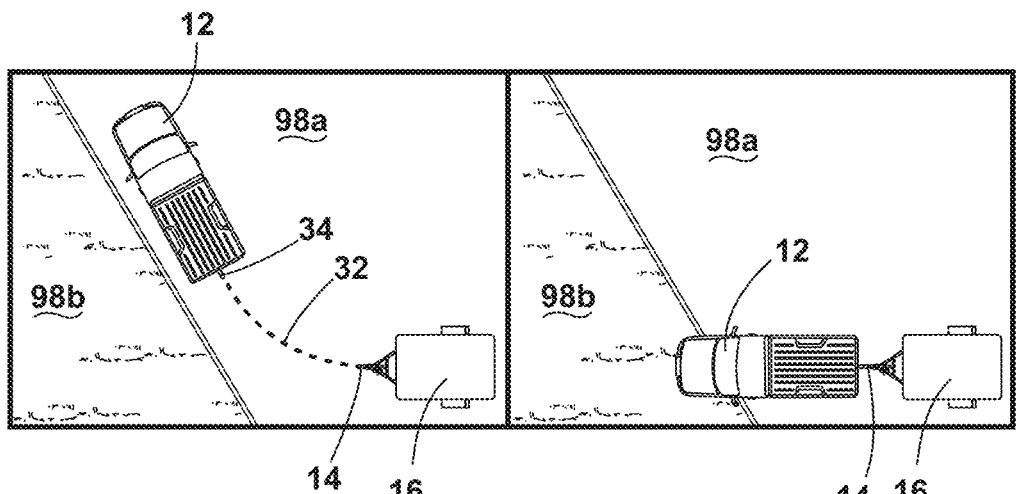
FIGS. 13A and 13B are overhead schematic views showing a vehicle positioned relative to a trailer such that a path to align the vehicle with the trailer results in a final vehicle heading with a portion of the vehicle on a different ground surface portion than the trailer.
Figures 14A, 14B:
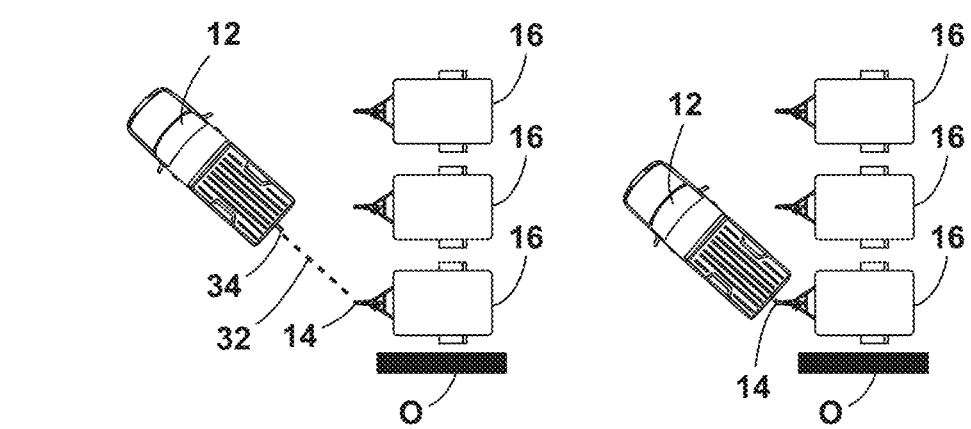
FIGS. 14A and 14B are overhead schematic views showing a vehicle reversing toward a trailer that is positioned adjacent objects such that a final heading angle of the vehicle relative to the trailer restricts movement of the trailer.
Figures 15A, 15B:
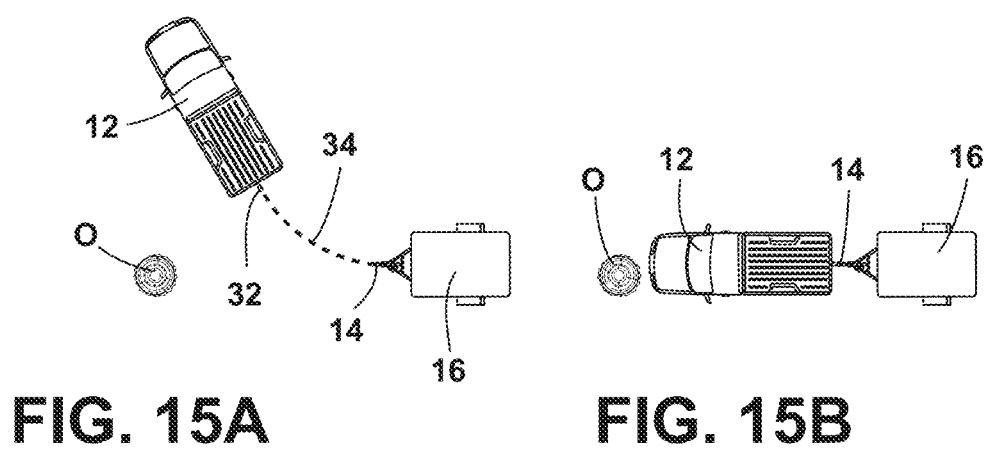
FIGS. 15A and 15B are overhead schematic views showing a vehicle positioned relative to a trailer such that a path to align the vehicle with the trailer results in a final vehicle heading with movement of the vehicle obstructed by an object.

Turning now to FIGS. 13A-15, various scenarios are shown in which a path 32 derived by execution of path derivation routine 66 results in an undesirable heading angle difference between the vehicle and the trailer. In the automated hitching operation discussed above with respect to FIGS. 1-6, system 10 automatically determines the path 32 from the initial vehicle position (e.g., FIG. 3) to the final vehicle position (e.g., FIG. 6). In many situations, the vehicle 12 position at alignment with trailer 16 is acceptable for desired driving of vehicle 12 after hitching with trailer 16. In some situations, however, the final vehicle position may present certain issues or difficulties. In the examples of FIGS. 13A-15, such issues may arise from the environment in which the automated hitching operation is carried out. As shown in FIGS. 13A and 13B, one possible path 32 derived by an example path derivation routine 66 may result in vehicle 12 moving onto a different type of ground surface 98b (FIG. 13B) compared the ground surface 98a on which it starts (FIG. 13A). In one aspect, such a final position of vehicle 12 may be avoided using an adjusted path 32', as derived by the process discussed above with respect to FIGS. 7A-12. However, such a process may not always be desired and may not alleviate all issues resulting from the final position of vehicle 12. In the example of FIGS. 14A, 14B. 15A, and 15B, the final relative heading angle (i.e., the hitch angle γ) between the vehicle 12 and the trailer 16 may not be optimal because of nearby objects. In particular, in FIGS. 14A and 14B, the targeted trailer 16 may be in a trailer parking lot adjacent other trailers 16a and/or another object O. In the example, the hitch angle γ resulting from the final vehicle 12 position (FIG. 14B) is such that the trailer 16 cannot be moved from its initial position due to the swingout of trailer 16 caused by movement at the hitch angle γ, which may result in contact with the other trailer 16b or object O. Additionally, as shown in FIGS. 15A and 15B, the final vehicle position may be incompatible with the driver's intended launch direction due to an obstructing object O or the like.

To alleviate the potential issues shown in FIGS. 14A-15B, as well as other similar issues, or to otherwise allow for additional alignment with user expectations, the system 10 described herein may further allow for user adjustment of the path 32, either directly or by allowing the user to adjust the final heading angle γ with respect to trailer 16. In this respect, the system 10 includes the above-described vehicle steering system 20 and imager (e.g., camera system 18) outputting image data 55 of a field of view to the rear of the vehicle 12. The controller 26 identifies coupler 14 of the trailer 16 within the image data 55 and derives the initial backing path 32 to align the hitch ball 34 with the coupler 14. The controller 26 then receives a user adjustment of the backing path 32 and derives an adjusted backing path 32' based on the user adjustment. Subsequently, the controller 26 controls the vehicle steering system 20 to maneuver the vehicle 12, during reversing, along the adjusted backing path 32'.

Figure 16:
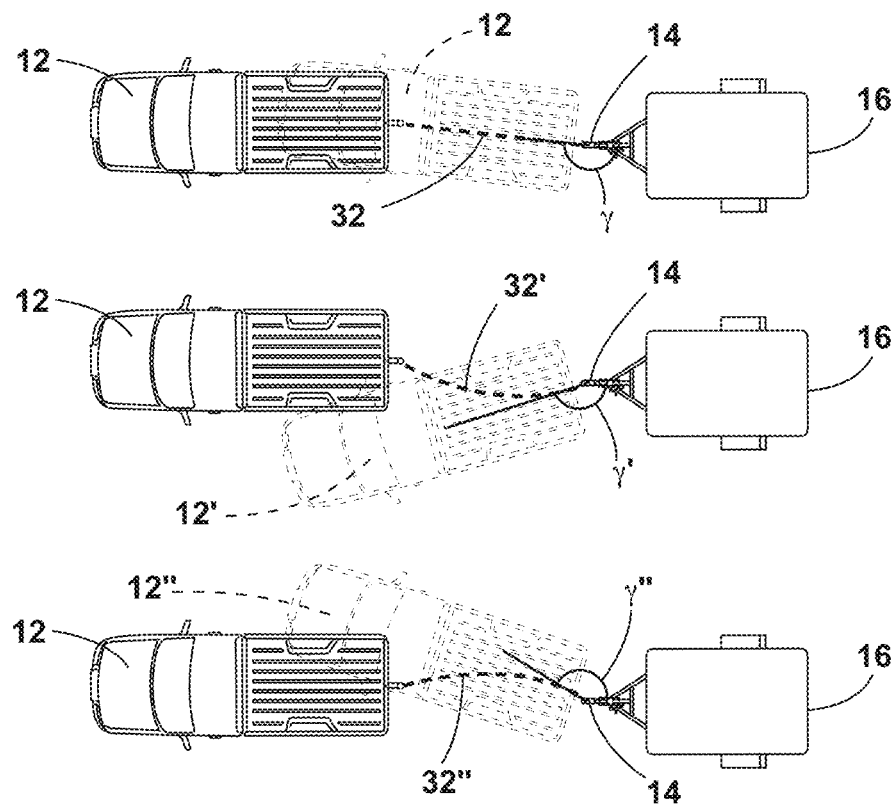
FIG. 16 is an overhead schematic view of a vehicle positioned relative to a trailer shown with multiple possible paths to align the vehicle for hitching with the trailer, each path resulting in a different relative heading angle in the aligned position.
Figure 17:
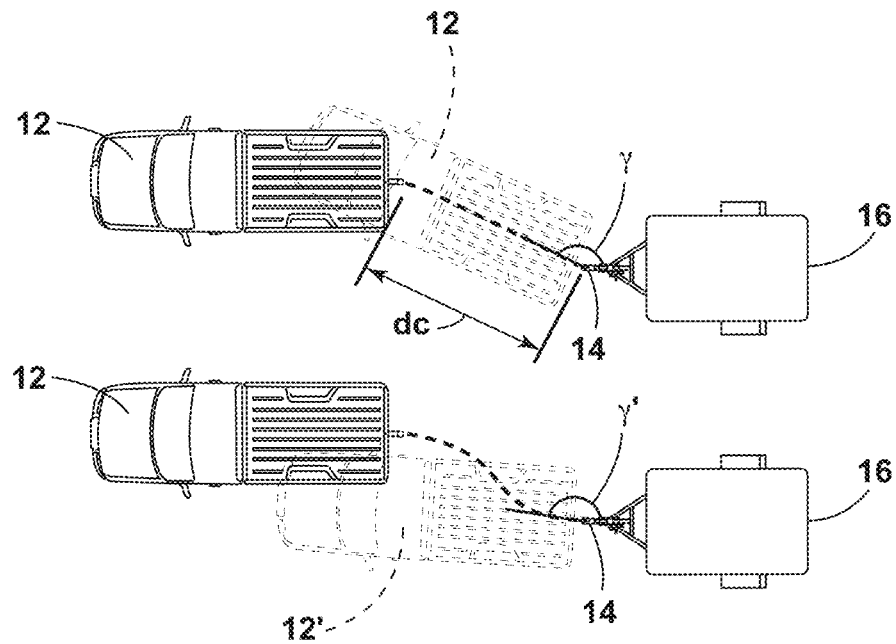
FIG. 17 is an overhead schematic view of a vehicle in an alternative position relative to a trailer shown with multiple possible paths to align the vehicle for hitching with the trailer, each path resulting in a different relative heading angle in the aligned position.

As shown in FIGS. 16 and 17, in one aspect system 10 can provide alternate paths 32' and 32" using a modified path derivation routine 66 based on an estimation of the heading angle γ, such that multiple final angles γ, γ', and γ" are available to the driver. The system 10 can display multiple path options 32, 32', and 32" on the display screen 44 such that the user is able to select their preferred path based on a visualization of the corresponding heading angle γ, γ', and γ" by way of, for example, schematic depictions of vehicle 12, 12', and 12" relative to trailer 16. In one aspect, the primary, or standard, path 32 may be automatically selected with system 10 allowing the user to override the default by providing a touch input selection of one of the other paths 32' or 32", for example, on touchscreen 42. A similar scheme is shown in FIG. 17, where a main path 32 and an alternate path 32' are shown with different corresponding heading angles γ and γ' resulting from vehicle 12 being in an initially offset position relative to trailer 16.

In one aspect of such a scheme, the generation of the primary path 32 is according to the shortest route, but the alternate paths are calculated based on the final heading angle γ. In operation of such a scheme using system 10, the user initiates the automated hitching feature (e.g., using the vehicle HMI 40). The system 10 then detects the trailer 16 in the image data 55, using image processing routine 64. Using an algorithm within path derivation routine 66, the system 10 determines the main path 32 from the current vehicle 12 position, to the final position at which the hitch ball 34 is aligned with the coupler 14. This process may, in one example, involve a variation of a "nearest-distance" strategy, such that the vehicle 12 follows as short of a path 32 as possible, and assumes a suitable distance de between the vehicle 12 and the trailer 16. The final relative heading angle γ between the vehicle 12 and trailer 16 is whatever results from the path 32, without specific consideration by the system 10. To provide the alternate paths 32', 32", system 10 may further use vision processing and radar processing techniques to estimate the "pose" of the trailer 16 relative to the vehicle 12, such that a measurement of the relative heading angle γ is initially established. An aligned position at 0° is defined, and system 10 is programmed to calculate at least one alternate path 32' from the primary path 32 with the alternate path 32' resulting in a different final relative heading angle γ' at the finish of the maneuver, the alternate path 32', therefore, having a different curvature or character.

Figure 18:
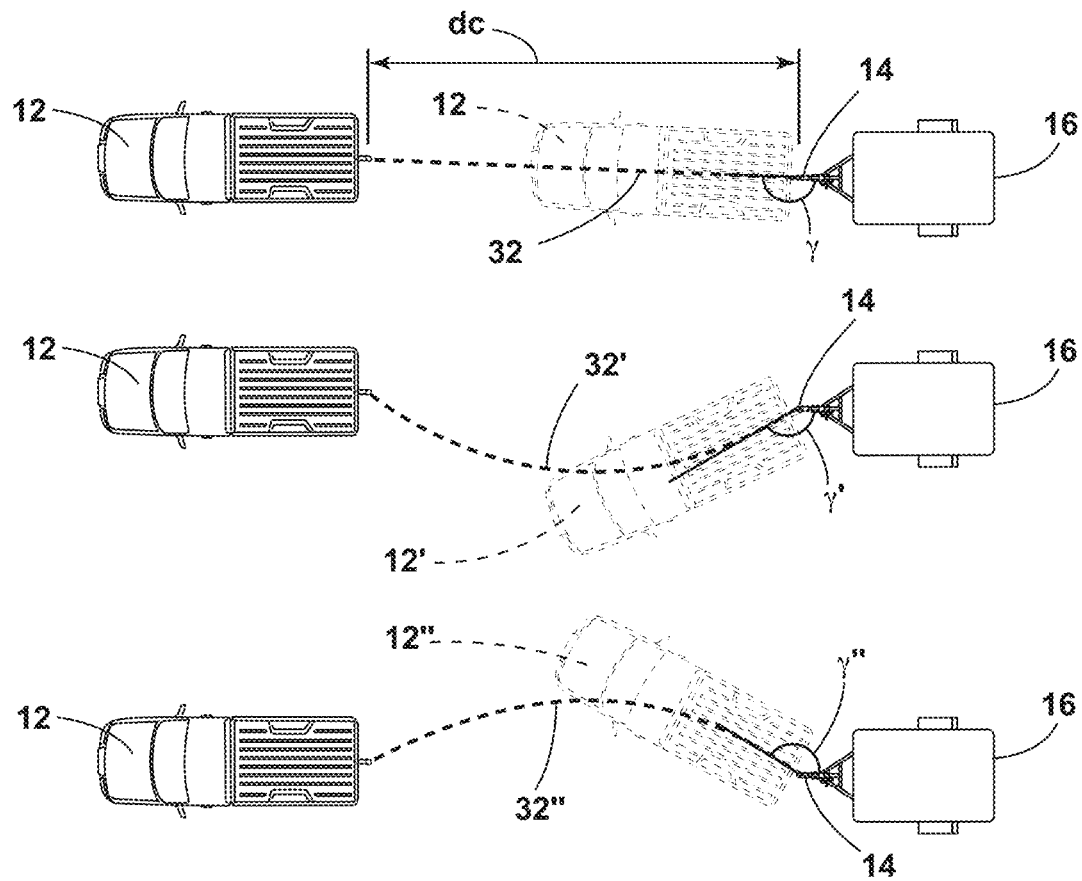
FIG. 18 is an overhead schematic view of a vehicle in an alternative position relative to a trailer shown with multiple possible paths to align the vehicle for hitching with the trailer, each path resulting in a different relative heading angle in the aligned position.

The criteria used to develop the alternate path 32' may be based on the existing criteria of the primary path 32 development. In one aspect, if the primary path 32 has an aligned heading angle and the end of the maneuver (within a threshold value, i.e. ±10°, such as what is shown in FIG. 16), based on projected calculations, the path derivation routine 66 may determine an alternate path 32' with a misaligned heading angle γ (e.g., +30°, −30°, or both to provide multiple alternate paths 32' and 32"). If the primary path 32 ends with a heading angle γ that is outside the threshold of "aligned", the path derivation routine 66 may generate a single alternate path 32' (as shown in FIG. 17) with an aligned heading angle γ. In the examples shown in FIGS. 16 and 17, the primary path 32 distance is relatively short, such that the path derivation routine 66 has little flexibility, including in the difference in heading angle γ' and γ" achieved by alternate paths 32' and 32". However, if the path 32 length is sufficient, path derivation routine 66 may be able to generate alternative paths 32' and 32" with a larger divergence from the primary path 32, as shown in FIG. 18, and thus a more drastically different heading angle γ' and γ". Additionally, with a more divergent alternate path 32' or 32", the user may have greater flexibility in causing the vehicle 12 to travel across different ground terrain, and potentially avoid objects O that system 10 has not detected. In a further aspect, the path derivation routine 66 may be programmed with a maximum final heading angle (e.g. ±30°). If the distance $d_c$ to the trailer 16 is sufficient, the path derivation routine 66 can develop alternate paths 32', 32" up to this maximum tunable value. If the distance de is insufficient, the system 10 provides the maximum heading angle γ', γ" that can be achieved one reversing maneuver (i.e. no direction changes).

Figure 19A:
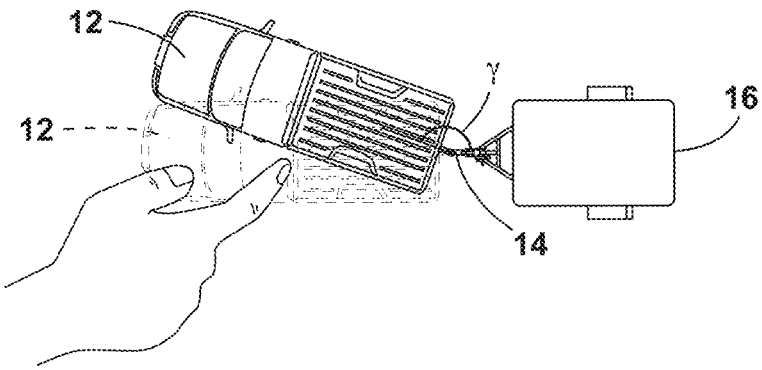
FIGS. 19A and 19B are depictions of an interface allowing a user to select between different final heading angles resulting from reversing maneuvers from an initial vehicle position along respective, associated backing paths.
Figure 19B:
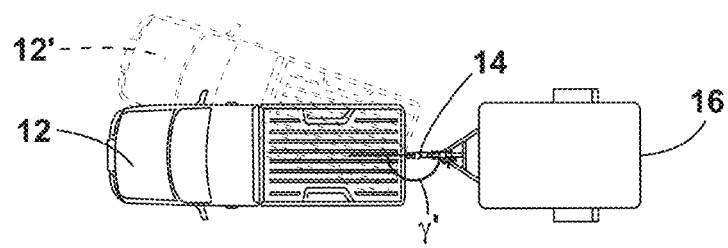

In this scheme, the user is able to select the final heading angle γ alignment using the vehicle HMI 40. This selection is achieved by generating the depicted 2D birds-eye view of the trailer 16 and the vehicle 12, including a depiction of the relative heading angle γ that will result the end of the path 32, which may also be displayed. The vehicle position 12 achieved by primary path 32 may be visually highlighted (such as by color, transparency, line thickness, etc.), and the vehicle position 12' resulting from alternate path 32', showing the resulting heading angles γ', γ" may be un-highlighted, as shown in FIG. 19A. The user is then able to touch an alternate relative angular alignment (vehicle image 12') to change to the desired heading angle γ', resulting in the use of alternate path 32' for use in operating routine 68, which is indicated to the user by changing the highlighted representation to that of the alternate vehicle alignment 12', as shown in FIG. 19B. In another variation, the controller 26 presents an image of the path 32 to the user and receives the user adjustment directly via the touchscreen 42 by allowing dragging of the vehicle representation 12 to another heading angle γ or by dragging a portion or path 32, with adjustments being permitted within the constraints of path derivation routine 66.

Figure 20A:
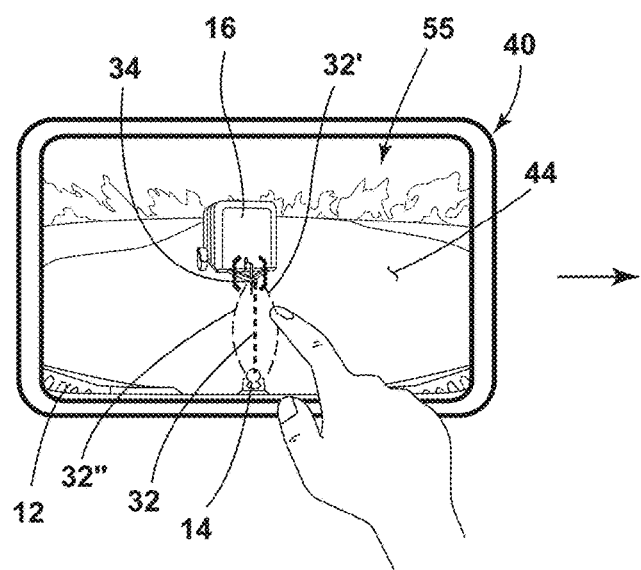
FIGS. 20A and 20B are depictions of an interface allowing a user to select between different vehicle paths for reversing maneuvers from an initial vehicle position.
Figure 20B:
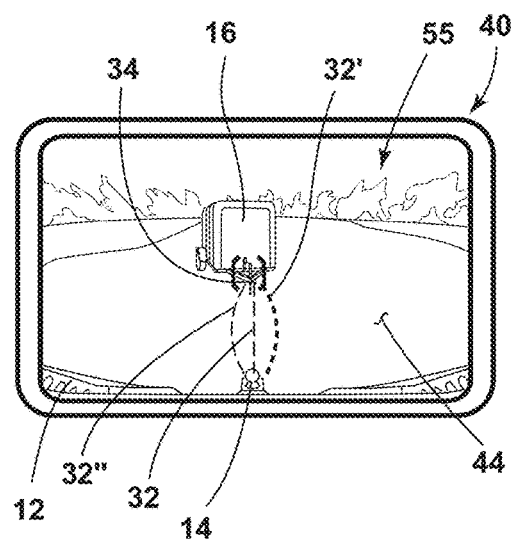

As shown in FIGS. 20A and 20B, the presentation of alternate paths 32' and 32" can also be presented directly on the camera image 55 adjacent the standard path 32, with the user being similarly able to select a desired alternate path 32' or 32" by an indication on touch screen 44. To display the paths 32, 32', and 32" in this scheme, the results of the path derivation routine 66, as discussed above, are converted to the camera view (display screen 44) to become overlays atop the camera view. Again, by default, the system 10 will use the primary path 32 in operating routine 68. However, if the user touches one of the alternate paths 32' or 32" on the screen 44, the system 10 will update the primary path 32 to the selected path 32' or 32". The user may be allowed to select different paths 32, 32', 32" multiple times with system 10 correspondingly updating, including during execution of operating routine 68. In another aspect, once the user initializes automated maneuvering (i.e. by pressing activation button 106) and operating routine 68 begins, the system 10 no longer offers the ability for the user to change the path 32, and the primary path 32 or selected alternate path 32' or 32" is "locked in" as the path the vehicle 12 follows. The system 10 then automatically maneuvers along the path 32, 32', or 32" until the vehicle 12 is aligned to the trailer 16, at which time the operation is completed.

In a further aspect, system 10 may allow for user adjustment of path 32, including by selection of at least one alternate path 32' within operation of the scheme discussed above with respect to FIGS. 7-15B. In this respect, system 10 may, where possible, offer a primary path 32 and at least one alternate path 32' to maintain vehicle 12 on a single ground surface portion 98a or type. Similarly, system 10, if unable to derive a path 32 to maintain vehicle 12 on a single ground surface portion, system 10 may present one or more alternate paths 32' that the user may select as a best option, given an observation of the surroundings of vehicle 12 and trailer 16.

It is to be understood that variations and modifications can be made on the aforementioned system and related structures without departing from the concepts of the present disclosure, and further it is to be understood that such concepts are intended to be covered by the following claims unless these claims by their language expressly state otherwise.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A system for assisting in aligning a vehicle for hitching with a trailer, comprising:
   a vehicle steering system;
   at least one detector outputting a signal including scene data of an area to a rear of the vehicle; and
   a controller:
      receiving the scene data and identifying the trailer and a first ground surface within the area to the rear of the vehicle;
      differentiating between first and second portions of the first ground surface having first and second ground surface classifications, the first and second ground surface classifications indicating that the first and second portions of the first ground surface are of different surface types having a transition therebetween that may be traversed by the vehicle without leaving the first ground surface;
      deriving a backing path to align a hitch ball mounted on the vehicle to a coupler of the trailer to maintain the vehicle within the first portion of the ground surface having the first ground surface classification; and
      controlling the vehicle steering system to maneuver the vehicle during reversing along the backing path.

2. The system of claim 1, wherein the controller deriving the backing path is a result of an attempt to derive the backing path, and when the controller fails to derive the backing path to align the hitch ball with the coupler to maintain the vehicle within the first portion of the ground surface, the controller initially refrains from controlling the vehicle steering system to maneuver the vehicle during reversing along the backing path, a transition between the first ground surface portion and the second ground surface portion being traversable by the vehicle in movement along the backing path.

3. The system of claim 2, wherein, when the controller fails to derive the backing path to align the hitch ball with the coupler to maintain the vehicle within the first portion of the ground surface, the controller derives the backing path to align the hitch ball mounted on the vehicle to the coupler of the trailer that is not constrained to the first portion of the ground surface.

4. The system of claim 3, wherein, prior to controlling the vehicle steering system to maneuver the vehicle during reversing along the backing path that is not constrained to the first portion of the ground surface, the controller outputs an indication that the backing path requires a change in driving surface classification.

5. The system of claim 1, wherein:
   the at least one detector includes an imaging system including a plurality of video cameras mounted on the vehicle outputting image data of a respective field of view; and
   one of the controller or the at least one detector concatenates the image data from each of the plurality of video cameras into a single image data signal included in the scene data.

6. The system of claim 1, wherein:
   the at least one detector includes at least one of a radar and an ultrasonic detector acquiring object position data for the area to the rear of the vehicle; and
   the object position data is included in the scene data.

7. The system of claim 1, wherein the controller differentiates between different classifications of the ground surface using texture analysis to determine that the first and second portions of the first ground surface are of different surface types within a corresponding tolerance range.

8. The system of claim 7, wherein the controller differentiates between different classifications of the ground surface using texture analysis to associate the first ground surface classification with the first ground surface portion and the second ground surface classification with the second ground surface the first and second ground surface classifications corresponding with different surface types by overall texture.

9. The system of claim 7, wherein the controller differentiates between different classifications of the ground surface using texture analysis by performing a similarity evaluation among a plurality of textures detected on the first ground surface to determine that the surface types associated with the first and second ground surface portions are distinct from each other.

10. The system of claim 9, wherein the texture analysis is carried out using a trained neural network executing a triplet-loss function.

11. The system of claim 1, wherein the controller differentiates between different classifications of the ground surface by identifying a first specific surface type associated with the first ground surface classification and a second specific surface type associated with a second ground surface classification associated with a portion of the at least one ground surface, the first and second specific surface types including different respective ones of asphalt, concrete, grass, or dirt.

12. The system of claim 1, wherein the controller omits a portion of the scene data comprising the trailer from the scene data.

13. The system of claim 1, wherein the controller accepts a user input for adjustment of the backing path to align the hitch ball to the coupler of the trailer, including movement of the vehicle from the first portion of the ground surface having the first ground surface classification to the second portion of the ground surface having the second ground surface classification.

14. A method for assisting in a hitching operation of a vehicle with a trailer, comprising:
   receiving scene data from at least one detector outputting a signal including the scene data of an area to a rear of the vehicle;
   identifying the trailer and a first ground surface within the area to the rear of the vehicle;
   differentiating between first and second portions of the first ground surface having first and second ground surface classifications, the first and second ground surface classifications indicating that the first and second portions of the first ground surface are of different surface types having a transition therebetween that may be traversed by the vehicle without leaving the first ground surface;

deriving a backing path to align a hitch ball mounted on the vehicle to a coupler of the trailer to maintain the vehicle within the first portion of the ground surface having the first ground surface classification; and controlling a vehicle steering system to maneuver the vehicle during reversing along the backing path.

15. The method of claim 14, wherein deriving the backing path is a result of an attempt to derive the backing path, the method further including failing to derive the backing path to align the hitch ball with the coupler to maintain the vehicle within the first portion of the ground surface and initially refraining from controlling the vehicle steering system to maneuver the vehicle during reversing along the backing path, a transition between the first ground surface portion and the second ground surface portion being traversable by the vehicle in movement along the backing path.

16. The method of claim 15, wherein, upon failing to derive the backing path to align the hitch ball with the coupler to maintain the vehicle within the first portion of the ground surface, the method includes deriving the backing path to align the hitch ball mounted on the vehicle to the coupler of the trailer that traverses the first and second ground surface portions and presenting a corresponding notification to a user.

17. The method of claim 14, further including accepting a user input for adjustment of the backing path to align the hitch ball to the coupler of the trailer, including movement of the vehicle from the first portion of the ground surface having the first ground surface classification to the second portion of the ground surface having the second ground surface classification.

18. The method of claim 14, wherein the step of differentiating between first and second portions of the first ground surface having first and second ground surface classifications includes differentiating between different classifications of the ground surface using texture analysis to determine that the first and second portions of the first ground surface are of different surface types within a corresponding tolerance range.

19. The method of claim 18, wherein the step of differentiating between first and second portions of the first ground surface having first and second ground surface classifications further includes differentiating between different classifications of the ground surface using texture analysis to associate the first ground surface classification with the first ground surface portion and the second ground surface classification with the second ground surface the first and second ground surface classifications corresponding with different surface types by overall texture.

20. The method of claim 18, wherein the step of differentiating between first and second portions of the first ground surface having first and second ground surface classifications further includes using texture analysis by performing a similarity evaluation among a plurality of textures detected on the first ground surface to determine that the surface types associated with the first and second ground surface portions are distinct from each other.

* * * * *